United States Patent [19]

Caggiani

[11] Patent Number: 5,229,062
[45] Date of Patent: Jul. 20, 1993

[54] METHOD FOR SEPARATING MOLD PLATES FROM A CASTING

[75] Inventor: Carlos Caggiani, Boca Raton, Fla.

[73] Assignee: Sermatech International, Inc., Limerick, Pa.

[21] Appl. No.: 744,412

[22] Filed: Aug. 13, 1991

[51] Int. Cl.⁵ .................... B28B 7/02; B29C 33/24
[52] U.S. Cl. .................... 264/334; 249/167; 425/125; 425/451.9
[58] Field of Search .................... 264/334, 335, 264; 425/125, 443, 451.9; 249/167

[56] References Cited

U.S. PATENT DOCUMENTS 1,309,128 7/1919 Gammeter .................... 264/334

Primary Examiner—Jan H. Silbaugh
Assistant Examiner—Angela Ortiz
Attorney, Agent, or Firm—Reising, Ethington, Barnard, Perry & Milton

[57] ABSTRACT

A method and apparatus for separating an upper (12) and lower (14) mold plate of a mold assembly (10) from a preformed substrate or casting (16) comprises a mold ejection apparatus (70) having a support surface (76) to receive and support the mold assembly (10). A plurality of clamps (84) pivotally connected to the support surface (76) engage the preformed substrate (16) at spaced apart intervals about the periphery of the preformed substrate (16) to restrain the substrate (16) and lower mold plate (14) against the support surface (76). The apparatus further includes a plurality of secondary hydraulic pumps (98) comprising a piston (106) and cylinder (108) assembly and a lifting bar (120) pivotally connected to one end of the piston (106). The secondary pumps (98) are supported on the support surface (76) at spaced apart intervals adjacent the periphery of the mold assembly (10). The lifting bars (120) engage a plurality of lifting pins (46) on the upper mold plate (12) to lift the upper plate (12) upwardly away from the substrate (16) as the substrate (16) and lower plate (14) are restrained by clamps (84) against the support surface (76). A master hydraulic pump (132) is activated to provide a simultaneous operating force to each of the secondary hydraulic pumps (98) to uniformly separate the upper mold plate (12) from the preformed substrate (16).

8 Claims, 6 Drawing Sheets

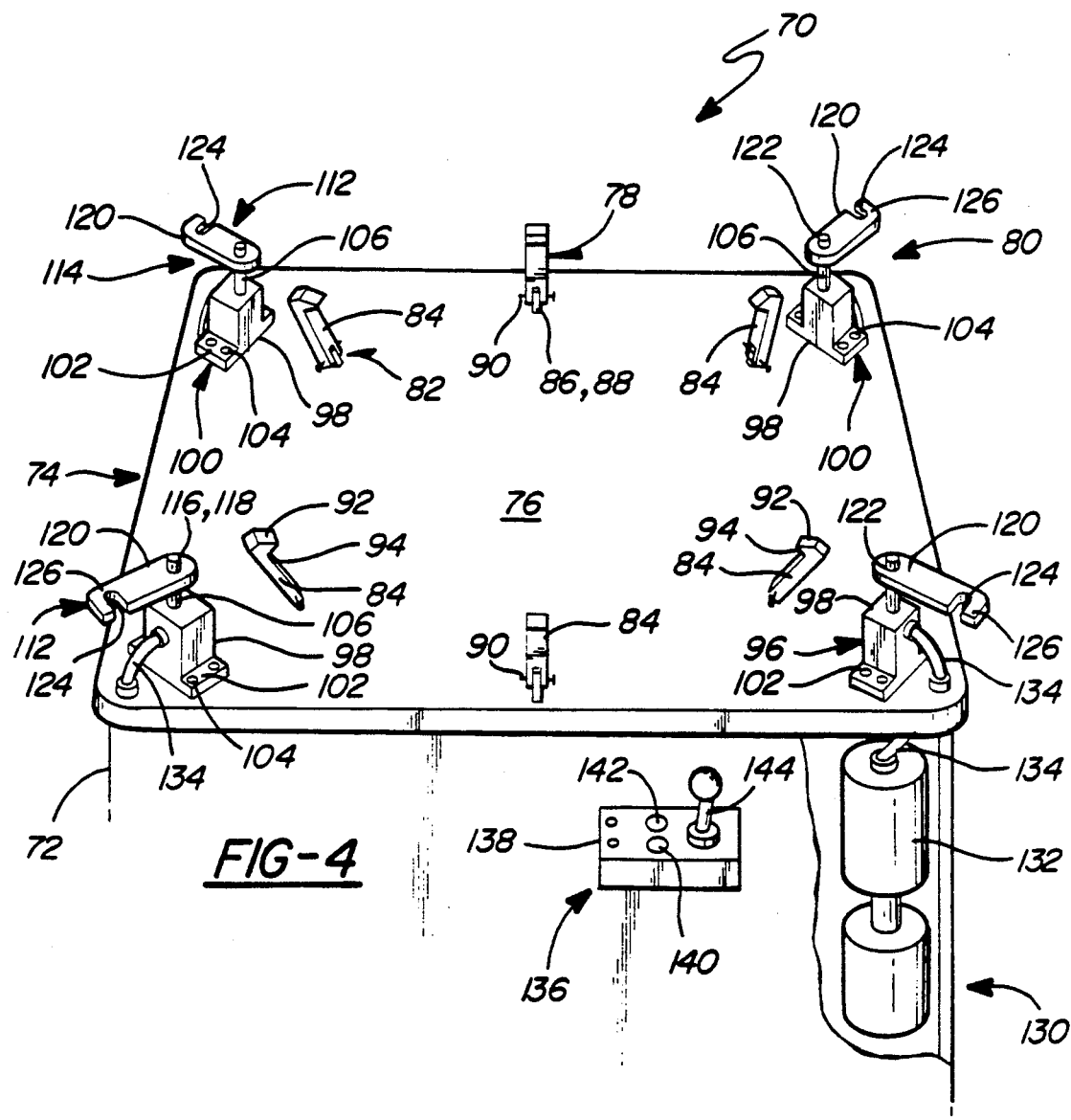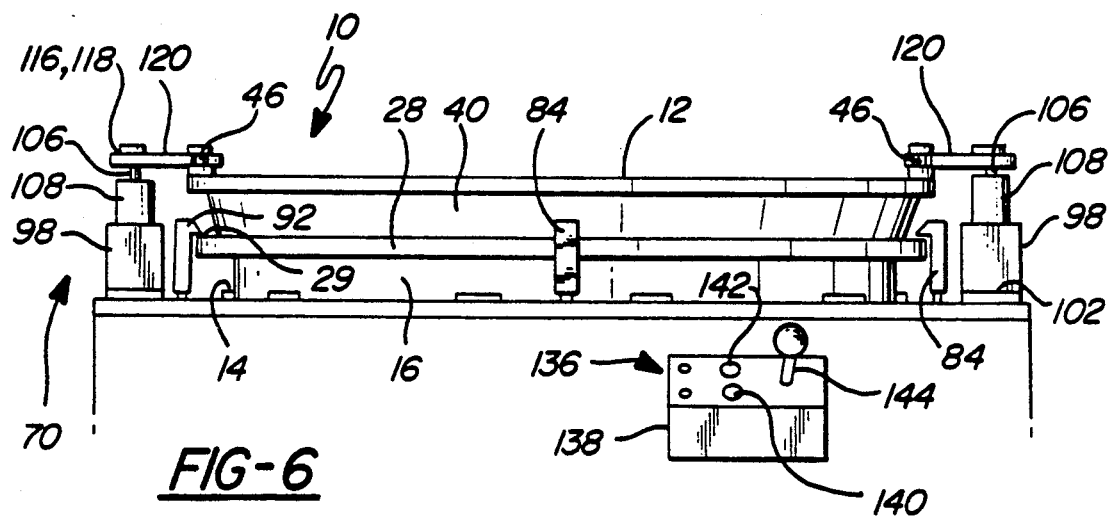

METHOD FOR SEPARATING MOLD PLATES FROM A CASTING

BACKGROUND OF THE INVENTION

1. Technical Field

The subject invention relates generally to a mold ejection machine and more specifically, to a method and apparatus for separating mold plates from a preformed substrate or casting.

2. Background Art

By way of background, a molding assembly generally includes an upper and lower mold plate forming a mold cavity or molding surface therebetween. Generally, a casting is molded in the mold cavity between the upper and lower plates. Alternatively, a preformed substrate or preformed casting is positioned between the upper and lower mold plates and a material such as rubber or plastic is mold injected onto the preformed substrate or a surface or plurality of surfaces of the preformed substrate. As the injected material bonds to the substrate, it often additionally bonds to one or both of the mold plates forming the mold cavity. After the bonding is complete, the mold plates must be separated from the preformed substrate without damaging the bonded material.

As shown in the prior art FIG. 1, a typical mold assembly is shown including upper and lower mold plates and a preformed substrate positioned between the upper and lower mold plates. The substrate is embraced between the plates by a plurality of vise members spaced about the periphery of the plates. The upper mold plate includes a first and second plate member interconnected by a plurality of bolts spaced about the periphery of the plates. A mold cavity is formed between the upper mold plates and the lower mold plate for receiving the preformed substrate and a plurality of vanes on the preformed substrate. A rubber or plastic material is injected into the mold cavity and bonded about the inner and outer surfaces of the preformed substrate and the substrate vanes. The material, however, also tends to bond to upper mold plates. Therefore, the upper mold plates must be separated from the substrate without damaging the bonded surface material. The prior art mold assembly, FIG. 1, is disassembled by releasing the vise members from the mold plates to release the preformed substrate therebetween. The bolts interconnecting the first and second plate members of the upper mold plates are then manually released until the plate members may be separated. However, the lower plate member, in abutment with the substrate, remains bonded to the substrate due to the bonding of the injected surface material. Therefore, the plate member must be wedged or hammered from the substrate to separate the plate from the upper surface of the substrate. The manual separating process between the upper mold plate and preformed substrate is time consuming and often results in damage to the bonded surface material on the substrate. Thus, an apparatus and process is desirable to automatically separate the mold plates from the substrate without damaging the bonded surface material.

The U.S. Pat. No. 3,450,190 to Mittermaier et al, issued Jun. 17, 1969, discloses a mold casting apparatus for molding a casting and for separating the casting from an upper and lower mold plate. The apparatus includes a support structure supporting a plurality of lower mold plates forming a mold cavity. The lower mold plates are restrained against the support structure by a pair of clamps. A hydraulic pump extending from the support structure lowers an upper mold plate downwardly into the mold cavity and a mold casting is formed about the contour of the upper mold plate. As the upper mold plate is raised upwardly from the lower mold plate, a pair of rods abut against a stripper plate forcing the stripper plate against the casting. The stripper plate includes a plurality of stripper pins to engage the peripheral edge of the casting and press the casting from the mold plate as the stripper plate is forced against the casting. However, the apparatus is deficient in that it does not include means for restraining the mold casting against the support structure while the upper mold plate is removed.

SUMMARY OF THE INVENTION AND ADVANTAGES

In accordance with the present invention there is provided a mold ejection apparatus for separating an upper and lower mold plate of a mold assembly from a preformed substrate position between the upper and lower mold plates and defining a longitudinal axis extending therebetween, said apparatus comprising: support means for receiving and supporting the mold assembly, and characterized by restraining means to engage the preformed substrate for restraining the substrate and lower mold plate against the support means and separating means independent from the restraining means to engage the upper mold plate for separating the upper mold plate from the preformed substrate while the restraining means independently restrains the preformed substrate and the lower mold plate against the support means.

FIGURES IN THE DRAWINGS

Other advantages of the present invention will be readily appreciated as the same becomes better understood by reference to the following detailed description when considered in connection with the accompanying drawings wherein:

FIG. 4 is a partially broken away perspective view of a mold ejection apparatus according to the subject invention;

FIG. 6 is a front elevational view of the mold ejection apparatus engaging the mold assembly;

DETAILED DESCRIPTION OF THE DRAWINGS

Figure 1:
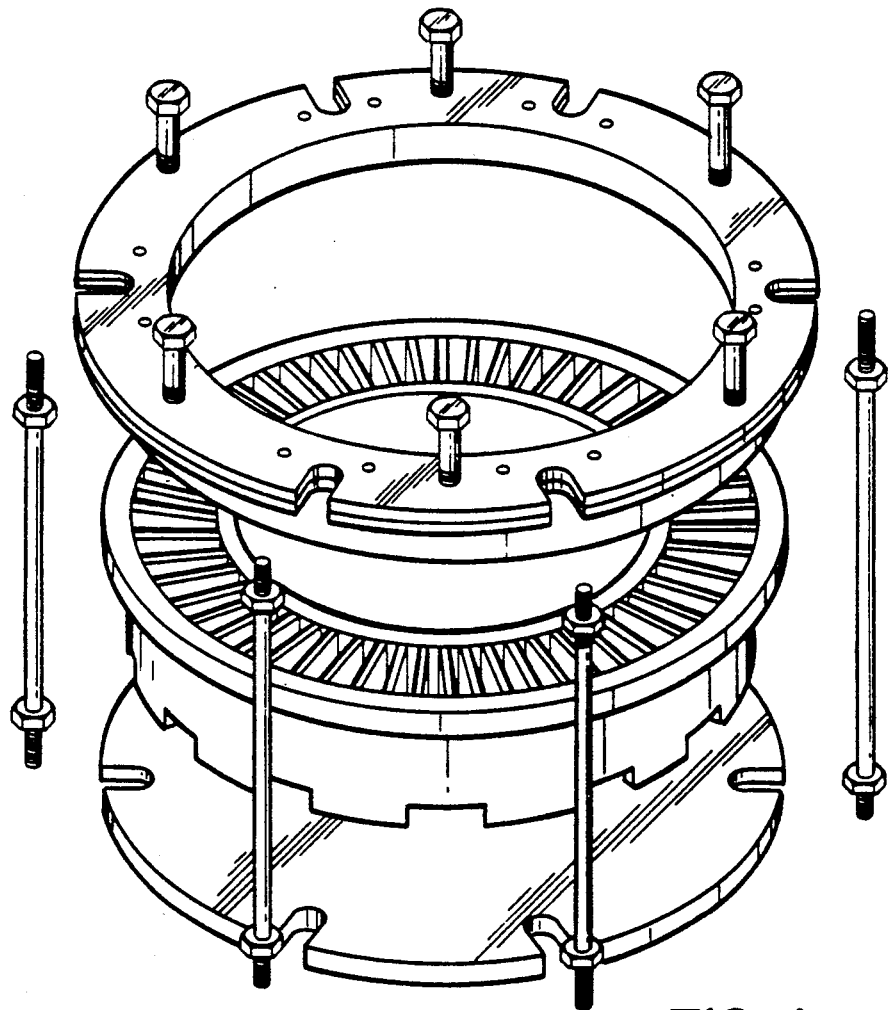
FIG. 1 is an exploded perspective view of a mold assembly of the prior art.
Figure 2:
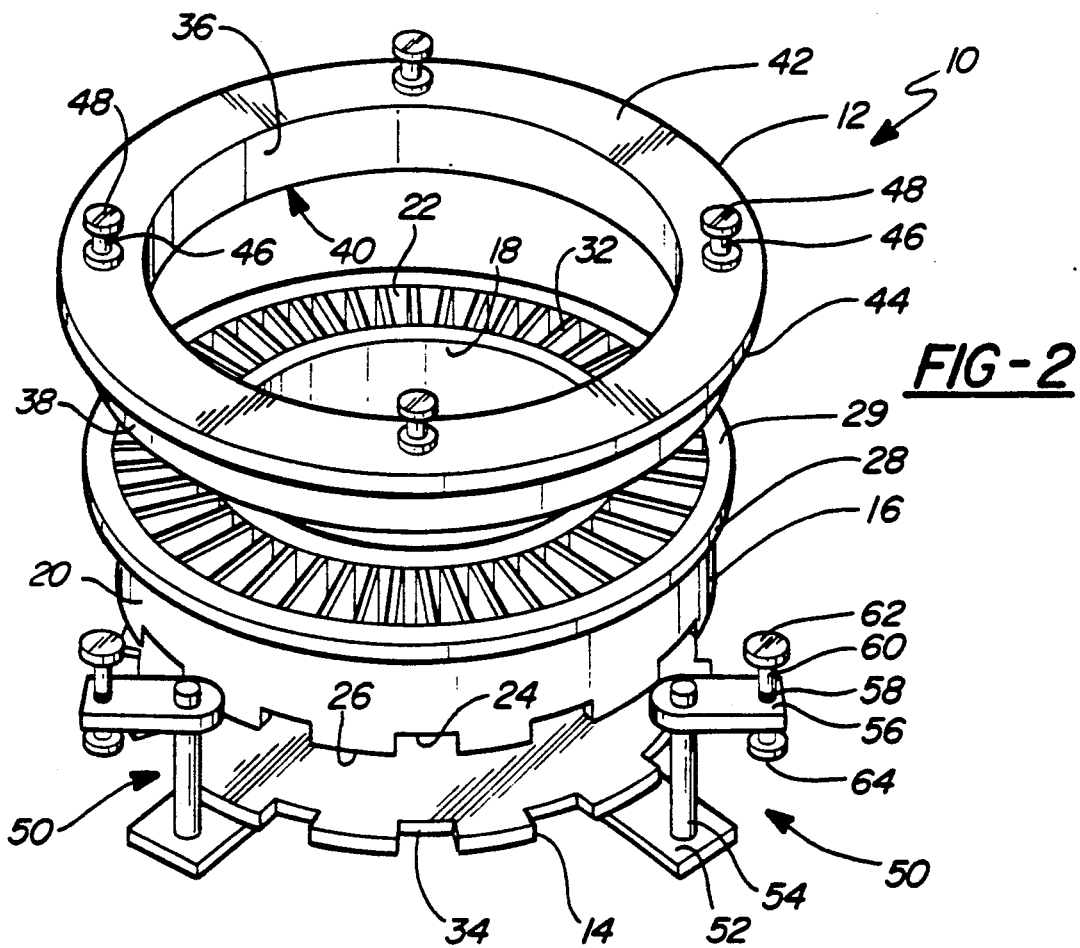
FIG. 2 is an exploded perspective view of a mold assembly according to the subject invention.

Referring to the Figures wherein like numerals indicate like or corresponding parts throughout the several views, a mold assembly is generally shown at 10 in FIG. 2. The mold assembly 10 comprises an upper mold plate 12, a lower mold plate 14 and a preformed substrate 16 positioned between the upper 12 and lower 14 mold plates. The mold assembly 10 further defines a longitudinal axis extending between the upper 12 and lower 14 mold plates. The preformed substrate 16 comprises a cylindrical stator commonly used in an aircraft turbine engine. The stator 16 in the preferred embodiment is constructed of titanium, however, may be constructed of any other commonly known substrate material or mold casted substance. The preformed substrate or stator 16 comprises an inner cylindrical wall 18 and an outer cylindrical 20 wall having a diameter larger than the inner wall diameter. The outer wall 20 further includes a first end having a plurality of spaced apart alternately staggered notches 24 and tabs 26 and a second end having an outwardly extending rim 28 forming an upper restraining surface 29. The stator 16 further includes a plurality of stator vanes 32 positioned between the inner 18 and outer 20 wall of the stator 16. The vanes 32 comprise a plurality of thin sheet-like material plates spaced apart and extending from the upper restraining surface 29 into the channel 22 formed between the walls 18,20 of the stator 16.

The lower mold plate 14 includes a flat supporting surface for supporting the preformed substrate or stator 16 and further includes a plurality of spaced apart notches 34 for receiving the tabs 26 of the outer wall 20 of the stator 16 respectively. The upper mold plate 12 includes an inner 36 and outer 38 rim forming a mold cavity 40 between the lower mold plate 14 and the rims 36, 38 of the upper mold plate 12. The upper mold plate 12 includes an upper lifting surface 42 having a flange 44 extending laterally outwardly from the outer rim 38 of the upper plate 12. The stator 16 is positioned in the mold cavity 40 between the lower mold plate 14 and the upper mold plate rims 36, 38 and the vanes 32 of the stator 16 are abutted against upper plate 12. In the preferred embodiment mold injected material commonly known as silicone rubber is injected into the mold cavity 40 to coat and bond about the surfaces of the stator 16 including the inner wall 18 and the plurality of vanes 32. It will be appreciated, however, that any mold injection material such as common plastics, rubbers, metallic coatings, or the like, may be injected about the stator 16. The upper mold plate 12 further includes a plurality of lifting pins 46 fixedly secured at spaced apart intervals along the upper surface of the upper mold plate 12. The lifting pins 46 include a flat circular lifting head 48 for receiving a separating force, described further hereinbelow.

The mold assembly 10 further includes a plurality of vise clamps 50 extending between the upper 12 and lower 14 mold plate at spaced apart intervals about the periphery of the mold assembly 10 to forcibly embrace the preformed substrate or stator 16 between the plates 12,14. The vise clamps 50 include a base 52 extending laterally outwardly from the lower mold plate 14, a vise rod 54 extending axially upwardly from the base 52 and having a first end fixedly secured to the base 52 and a second end pivotally connected to a vise plate 56. The vise plate 56 includes an aperture 58 for receiving a threaded vise screw, the vise screw 60 having upper 62 and lower 64 flat disc-shaped ends at opposite ends of the screw 60.

Figure 3:
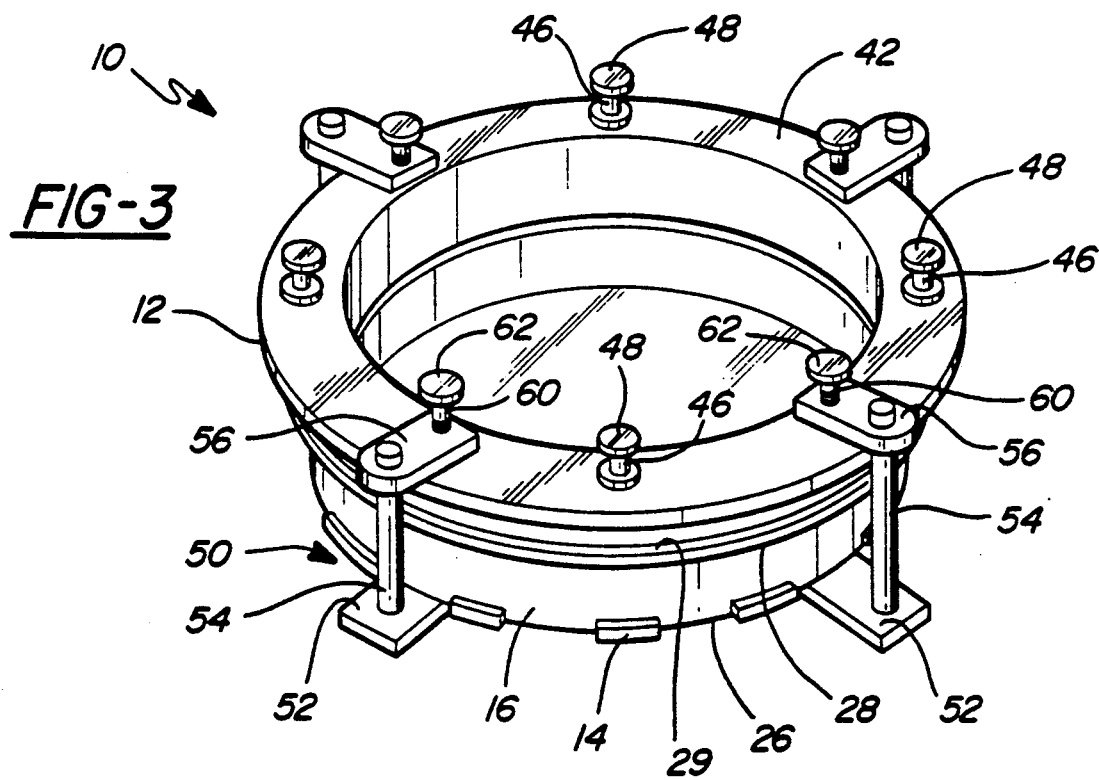
FIG. 3 is a perspective view of the preformed substrate embraced between the upper and lower mold plates of the mold assembly.
Figure 5:
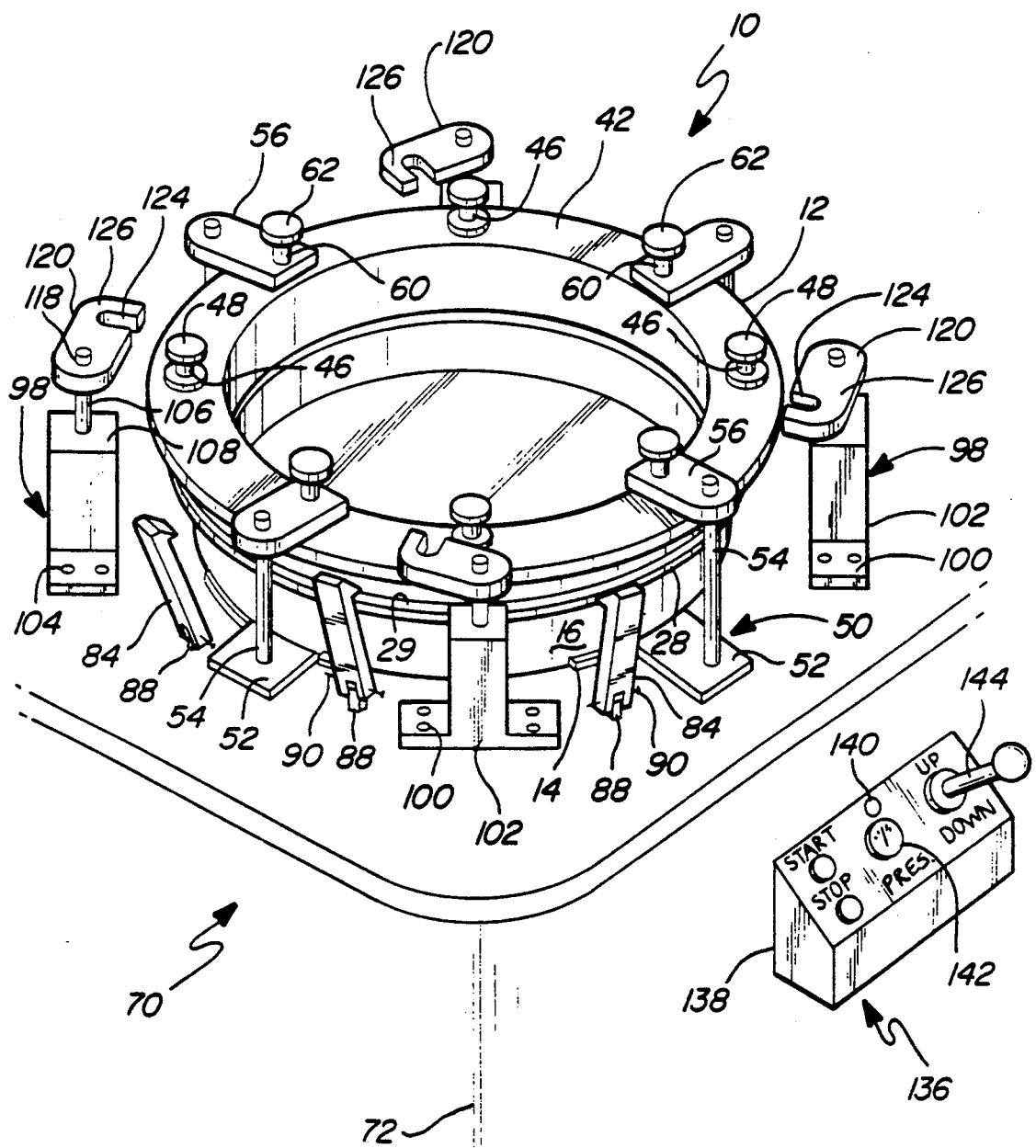
FIG. 5 is a perspective view of the mold ejection apparatus supporting the mold assembly.

Referring to FIG. 3, the preformed substrate or stator 16 is shown embraced and vise clamped between the upper 12 and lower 14 mold plates. The vise plates 56 are pivoted to a position extending axially above the upper surface 42 of the upper mold plate 12 and the threaded vise screws 60 are then rotated until the lower flat ends 64 of the screws 60 engage the upper surface 42 and firmly press the upper mold plate 12 against the stator 16 and lower mold plate 14. Additionally, the vise plates 56 and lifting pins 46 are alternately staggered about the periphery of the upper surface 42 of the upper mold plate 12.

A mold ejection apparatus as in accordance with the subject invention is generally shown at 70 is FIG. 4. The mold ejection apparatus 70 comprises a generally rectangular housing 72 having support means 74 for receiving and supporting the mold assembly 10. The support means 74 is more specifically a flat support surface 76 supported by the mold ejection housing 72. The mold ejection apparatus 70 is characterized by including restraining means 78 to engage the preformed substrate or stator 16 for restraining the preformed substrate 16 and lower mold plate 14 against the support means 74 and separating means 80 independent from the restraining means 78 to engage the upper mold plate 12 of the mold assembly 10 for separating the upper mold plate 12 from the preformed substrate or stator 16 while the restraining means 78 independently restrains the preformed substrate or stator 16 and the lower mold plate 14 against the support means 74.

The restraining means 78 includes removing means 82 for providing movement of the restraining means 78 between a restraining position engaging the preformed substrate or stator 16 and an unrestraining position spaced laterally from the stator 16. The restraining means 78 includes a plurality of clamps 84 to engage the outside diameter of the preformed substrate or stator 16 at spaced apart intervals about the periphery of the preformed substrate or stator 16. The clamps 84 are coupled to the support means 74 by a clamp coupling means 86 and extending axially upwardly from the support surface 76 to the preformed substrate or stator 16. The clamp coupling means 86 more specifically includes clamp pivot means 88 for providing pivotal movement of the clamp 84 between a clamped position engaging the preformed substrate or stator 16 and an unclamped position spaced laterally from the preformed substrate or stator 16. Each clamp pivot means 88 includes a pivot connection 88 having a locking pin 90 to move and lock the clamp 84 in the clamped position and unlock the clamp 84 to allow pivotal movement in the unclamped position. Further, the clamps 84 include an outwardly extending finger 92 having an engaging surface 94 to engage the outer rim 28 extending about the periphery of the preformed substrate or stator 16. The clamps 84 are positioned in the unclamped position with the fingers 92 spaced a predetermined distance laterally outwardly from the preformed substrate or stator 16 and mold assembly 10 to allow the assembler to position the mold assembly 10 on the support surface 76 without interference by the restraining means 78. It will be appreciated that the restraining means 78 could likewise be in an unclamped position with the clamps 84 spaced axially from the mold assembly 10 or any other position spaced from the assembly 10 so as to allow clearance for the support surface 76 to receive and support the mold assembly 10.

The mold ejection apparatus 70 further includes motor means 96 for applying a predetermined separating force simultaneously at spaced apart intervals about the periphery of the upper mold plate 12 to uniformly separate the upper mold plate 12 from the preformed substrate or stator 16. In the preferred embodiment, the motor means 96 includes a plurality of secondary hydraulic pumps 98 connected to the support surface 76 by a support coupling means 100 at spaced apart intervals adjacent the periphery of the mold assembly 10. It will be appreciated that the motor means 96 may include any motor commonly known in the art; electric, pneumatic, hydraulic, combustion, or the like, which is capable of providing a force to the upper mold plate 12. The hydraulic pumps 98 of the preferred embodiment include a pump housing 102 coupled to the support surface 76 by a plurality of fasteners 104, such as bolts. The housing 102 includes a fluid reservoir containing hydraulic fluid and a piston 106 and cylinder 108 assembly for providing an axial lifting force as will be described in further detail hereinbelow. The pumps 98 are further spaced laterally outwardly from the mold assembly 10 similar to the restraining means 78, such that, the mold assembly 10 may be received on the support surface 76 without interference with the motors 96. It will likewise be appreciated that the motor means 96 may by placed and secured axially above the mold assembly 10 and remained clear from the receiving support surface 76 of the assembly 10, or similarly may be position to the lateral side of the mold ejection housing 102 and subsequently move into position for applying the separating force.

The separating means 80 includes support coupling means 100 for coupling the separating means 80 to the support surface 76. The support coupling 100 includes the motor housing 102 connected to the support surface 76 by the support fasteners or bolts 104. The separating means 80 further includes engaging means 112 for providing movement of the separating means 80 between an engaged position engaging the upper mold plate 12 and a disengaged position spaced laterally from the upper mold plate 12. The separating means 80 further includes lifting means 114 for providing movement of the separating means 80 axial to the longitudinal axis to lift and separate the upper mold plate 12 a predetermined axial distance from the preformed substrate or stator 16. The lifting means 114 and engaging means 112 are coupled or interconnected by lift coupling means 116. More specifically, the lift coupling means 116 comprises a lift pivot means 118 for providing pivotal movement of the engaging means 112 between the engaged position and the disengaged position.

The lifting means 114 includes the piston 106 as previously discussed in the hydraulic pumps 98, the piston 106 having a first end coupled by the cylinder 108 to the hydraulic pump housing 102 and a second end connected by the lift pivot means 118 to a lifting bar 120. The lifting bar 120 is a longitudinal plate member having a first end including a pivot opening 122 for pivotally receiving the second end of the piston 106 and a second end including an arcuate channel 124 for receiving and lockingly engaging the locking pins 90 on the upper mold plate 12. The lifting bars 120 further include an upper contact surface 126 to engage the lifting heads 48 of the lifting pins 46 during application of the separating force.

The mold ejection apparatus 70 further includes an actuator means 130 for simultaneously actuating each of the secondary hydraulic pumps 98 to provide the simultaneous separating force to the upper mold plate 12. The actuator means 130 includes a master hydraulic pump 132 to provide pressurized fluid to each of the secondary hydraulic pumps 98. Similarly, the actuator means 130 may include any source of power; electric, combustion power, hydraulic, pneumatic or a combination of any of the above to provide the requisite power or force to the secondary hydraulic pumps 98. The master pump 132 is connected to the apparatus housing 72 and coupled to each of the secondary pumps 98 through fluid coupling lines 134. Controller means 136 is further included for controlling the master pump 132 between an actuated state providing the separating force and a non-actuated state. The controller means 136 includes a control box 138 fixed to the housing 72 and including a pressure regulator 140 to regulate the pressure of the master pump 132, a pressure gauge 142, and a pressure valve lever 144 to open and close a valve supplying pressure to the secondary pumps.

Figure 7:
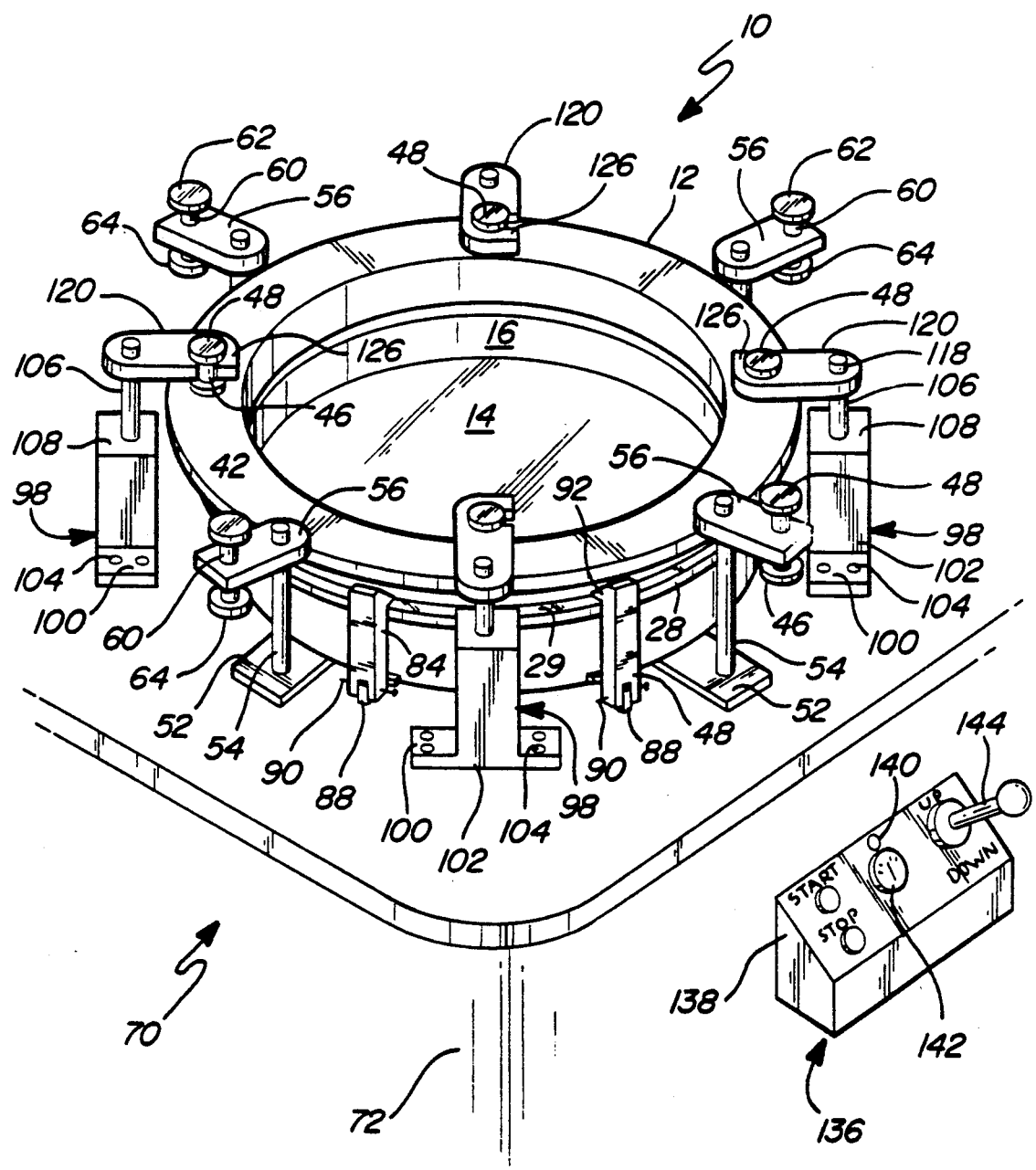
FIG. 7 is a perspective view of the mold ejection apparatus engaging the mold assembly.

In operation, referring to FIGS. 6 and 7, the mold assembly 10 is received and supported on the support surface 76 with the lower mold plate 14 against the surface 76. The restraining clamps 84 are pivoted from the unclamped position spaced from the stator 16 to the clamped position. The engaging surface 94 of the fingers 92 of the clamps 84 engage the rim 28 of the preformed substrate or stator 16 at spaced apart intervals about the stator 16 periphery. The locking pins 90 of the pivots 88 are then engaged with the clamps 84 to lock the clamps 84 in the engaged position. The vise screws 60 are then loosened to disengage the flat ends 64 from the upper mold plate 12 and then the vise plates 56 are pivoted laterally away from the upper mold plate 12 to disembrace the stator 16 from the upper 12 and lower 14 mold plates.

The separating means 80 are engaged with the upper mold plate 12 by pivoting the lifting bar 120 from the disengaged position spaced laterally from the mold assembly 10 to the engaged position with the lifting pins 46 of the upper mold plate 12 received in the channel 124 in the end of the lifting bar 120.

Figure 8:
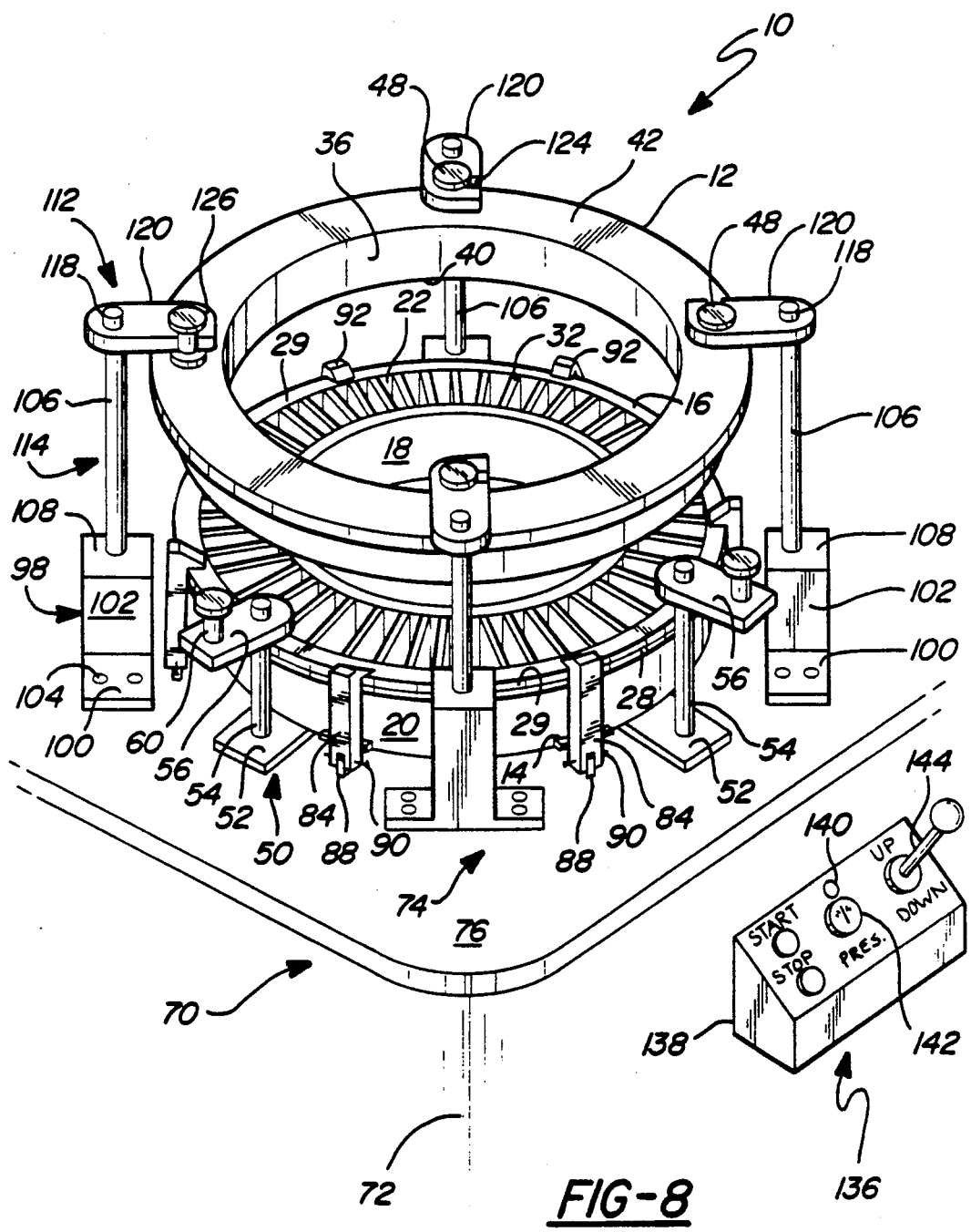
FIG. 8 is a perspective view of the mold ejection apparatus separating the upper mold plate from the preformed substrate.

As shown in FIG. 8, the pressure regulator 140 and pressure valve lever 144 of the controller means 136 are placed in the up or on position to actuate the master hydraulic pump 132. The master hydraulic pump 132 provides pressurized fluid simultaneously through the fluid lines 134 to each of the secondary hydraulic pumps 98 on the support surface 76. The piston 106 of each pump is forced axially upwardly from the cylinder 108 parallel to the longitudinal axis to provide the simultaneous separating force to the upper mold plate 12. The separating force is coupled through the lifting bars 120 to the head of the lifting pins 46 to force the upper mold plate 12 to lift upwardly a predetermined axial distance from the preformed substrate or stator 16. The retraining means 78 or clamps 84 independently restrain the stator 16 and lower mold plate 14 against the support surface 76. The separating force which is applied by the secondary hydraulic pumps 98 acts in an equal and opposite direction on the support surface 76 coupled through the pump housing 102. The force is then coupled to the pivots 88 connecting the clamps 84 to the support surface 76 to provide a restraining force against the rim 28 of the stator 16 to maintain the stator 16 and lower plate 14 against the support 76. Thus, the restraining force is supplied by the separating force, however, it is coupled through the support means 74 to provide an independent restraining means 78. It will be appreciated that the restraining means 78 could likewise have a restraining force supplied by an independent force such as a restraining pump independent of the hydraulic lifting pumps 98.

The subject invention is further characterized by including a method of separating the upper 12 and lower 14 mold plates of the mold assembly 10 supported by a support surface 76 and defining a longitudinal axis therebetween from a preformed substrate or stator 16 embraced between the upper 12 and lower 14 mold plates. The method comprises the steps of: supporting the mold assembly 10 on the support surface 76, and characterized by restraining the preformed substrate or stator 16 and lower mold plate 14 against the support surface 76 and separating the upper mold plate 12 from the preformed substrate or stator 16. The method further comprises the step of restraining the preformed substrate or stator 16 prior to separating the upper mold plate 12 from the preformed substrate or stator 16. The method further includes the steps of; applying a separating force simultaneously at spaced apart interval about the periphery of the upper mold plate 12 and uniformly separating the upper mold plate 12 from the preformed substrate or stator 16. More specifically, the method comprises the steps of; moving an engaging member 112 from a disengaged position spaced laterally from the mold assembly 10 to an engaged position engaging the upper mold plate 12, and moving a lifting member 114 axial to the longitudinal axis to separate the upper mold plate 12 a predetermined axial distance from the substrate 16. In the preferred embodiment, the method includes the steps of: supporting the mold assembly 10 of the support surface 76; unclamping the vise clamps 84 to release the preformed substrate or stator 16 from the mold plates; restraining the preformed substrate or stator 16 and lower mold plate 14 by engaging the fingers 92 of the restraining clamps 84 with the rim 28 of the stator 16 and engaging the locking pins 90 to lock the clamps 84 in the clamped position; and separating the upper mold plate 12 from the stator 16 by engaging the lifting bars 120 with the lifting pins 46 of the upper plate 12, actuating the master hydraulic pump 132 to provide pressurized fluid to the secondary pumps 98 and applying a separating force simultaneously at spaced apart intervals about the periphery of the upper plate to lift and separate the upper mold plate 12 a predetermined axial distance from the preformed substrate or stator 16.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of separating an upper (12) and lower (14) mold plate of a mold assembly (10) supported by a support surface (76) and defining a longitudinal axis therebetween from a preformed substrate (16) embraced between the upper (12) and lower (14) mold plates comprising the steps of: supporting the mold assembly (10) on the support surface (76); characterized by clamping a plurality of clamps (84) about the periphery of the preformed substrate (16) to retrain the substrate (16) against the support surface (76) by applying a force directly against the substrate (16) independent of the lower mold plate (14), and lifting the upper mold plate (12) to separate the upper mold plate (12) from the preformed substrate (16) while maintaining the preformed substrate (16) restrained against the support surface (76), removing the clamps (84) from the substrate (16) and removing the substrate (16) from the lower mold plate (14).

2. A method as set forth in claim 1 further characterized by clamping the preformed substrate (16) against the support surface (76) prior to lifting the upper mold plate (12) from the preformed substrate (16).

3. A method as set forth in claim 2 further characterized by applying a predetermined separating force simultaneously at spaced apart intervals about the periphery of the upper mold plate (12) and uniformly separating the upper mold plate (12) from the preformed substrate (16).

4. A method as set forth in claim 3 further characterized by moving an engaging member (112) in a direction at least partially transverse to the longitudinal axis from a disengaged position spaced laterally from the mold assembly (10) to an engaged position engaging the upper mold plate (12).

5. A method as set forth in claim 4 further characterized by moving the engaging member (112) in the engaged position axially upwardly along the longitudinal axis to lift and separate the upper mold plate (12) from the preformed substrate (16).

6. A method as set forth in claim 5 further characterized by moving the clamps (84) in a direction at least partially transverse to the longitudinal axis from an unclamped position spaced laterally from the substrate (16) to a clamped position engaged about the periphery of the substrate (16).

7. A method as set forth in claim 6 further characterized by pivoting the engaging member (112) in an arcuate path transverse to said longitudinal axis about a pivot (118) from said disengaged position to said engaged position.

8. A method as set forth in claim 7 further characterized by pivoting the clamps (84) in an arcuate path about a pivot (88) from said unclamped position to said clamped position.

* * * * *